J. P. ROE.
ENDLESS CONVEYER.
APPLICATION FILED APR. 19, 1919.
1,363,533.
Patented Dec. 28, 1920.
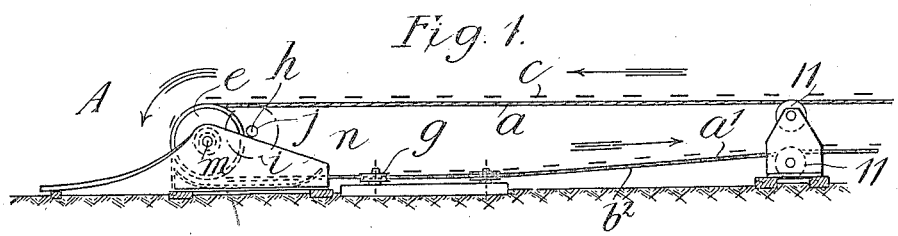
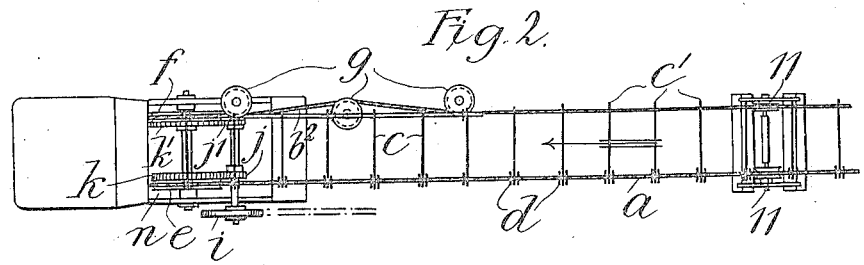
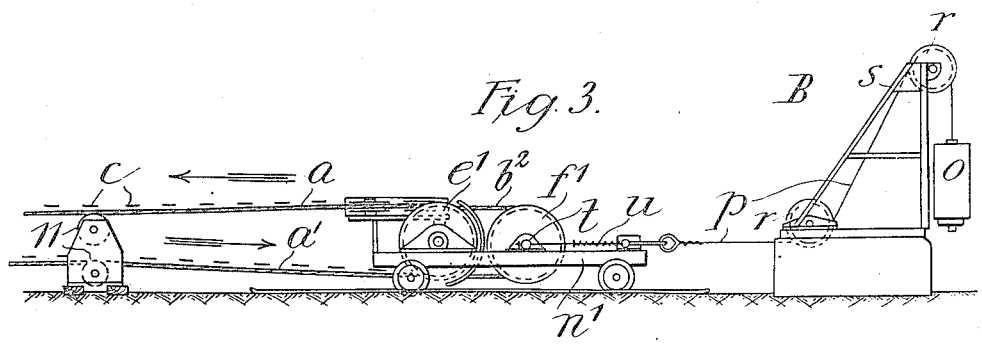
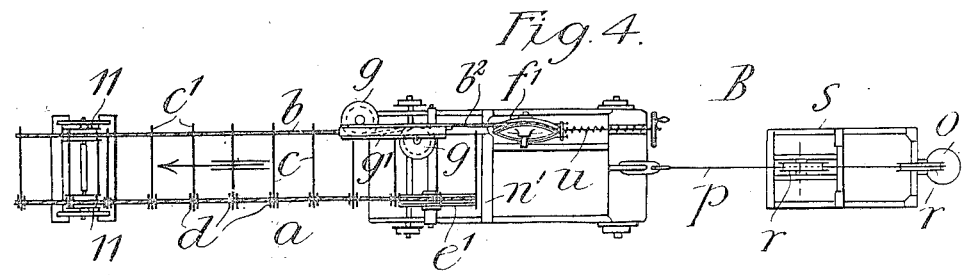

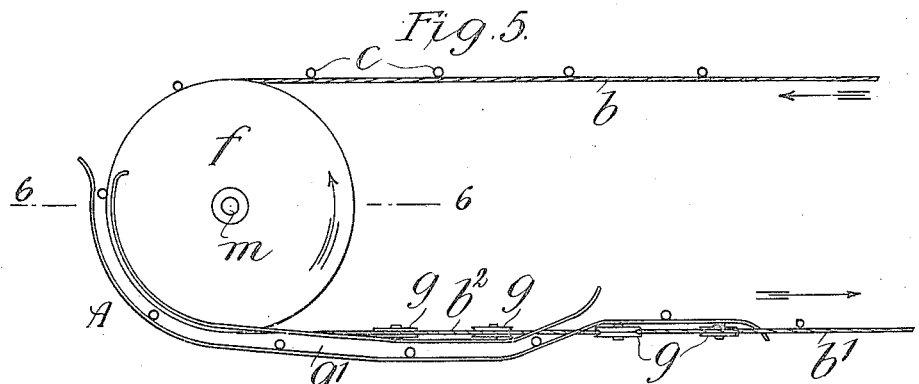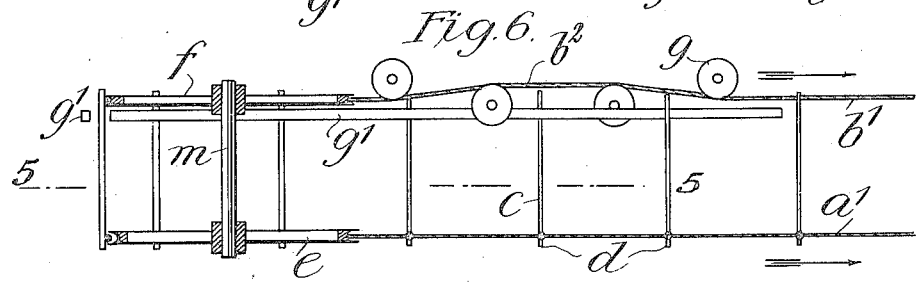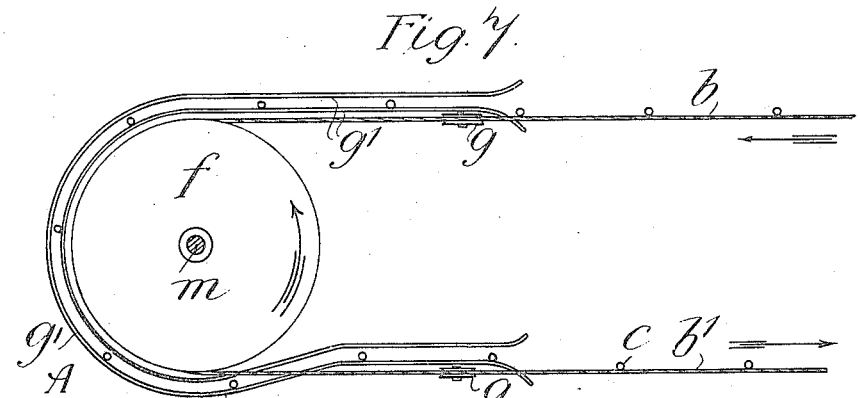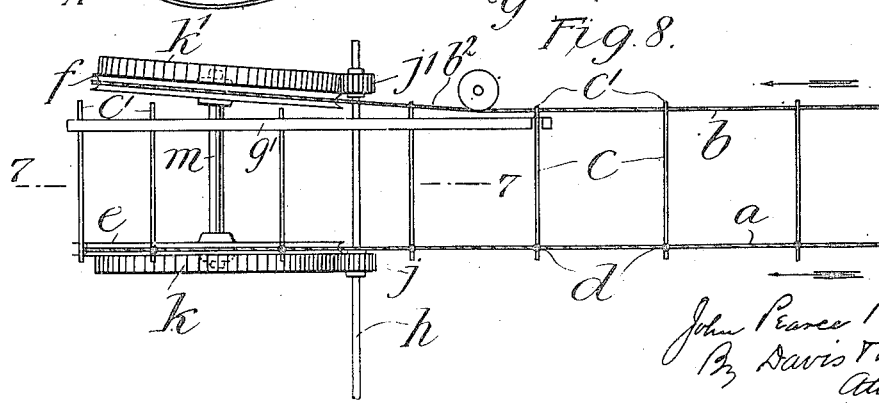

J. P. ROE.
ENDLESS CONVEYER.
APPLICATION FILED APR. 19, 1919.
1,363,533.
Patented Dec. 28, 1920.
8 SHEETS—SHEET 3.
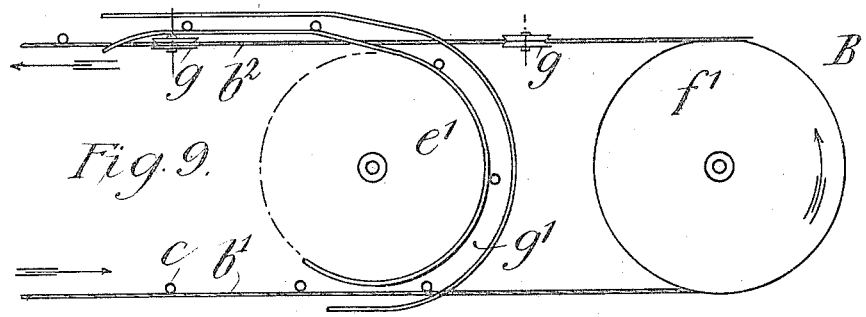
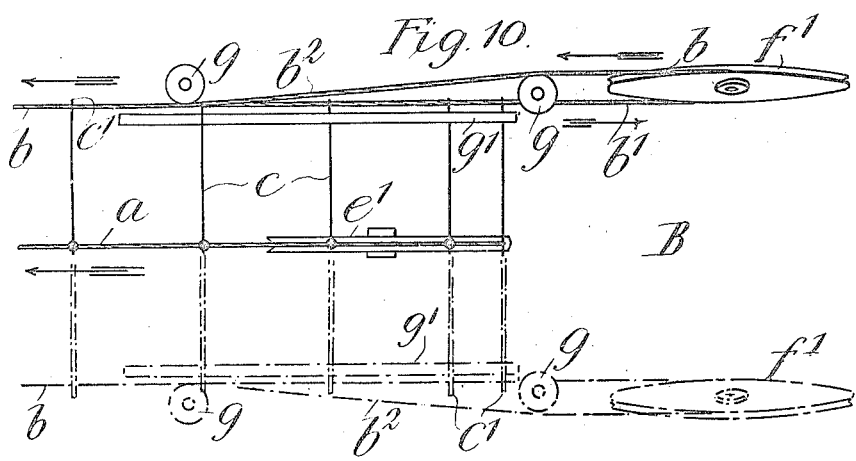
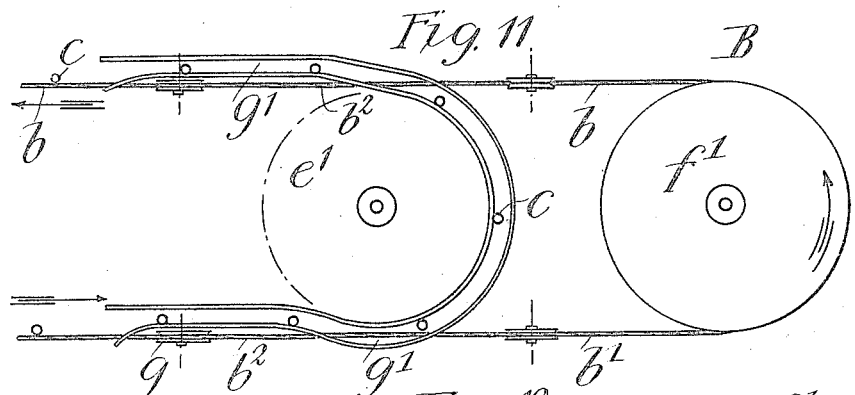
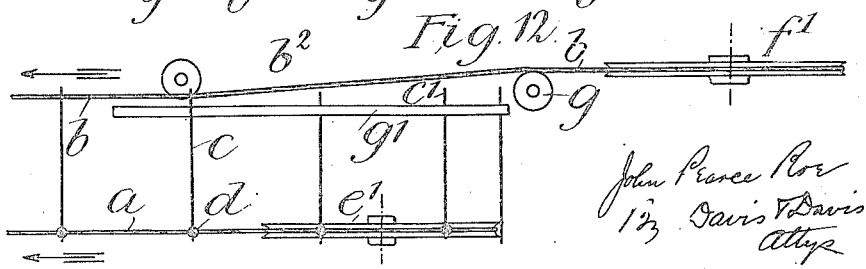

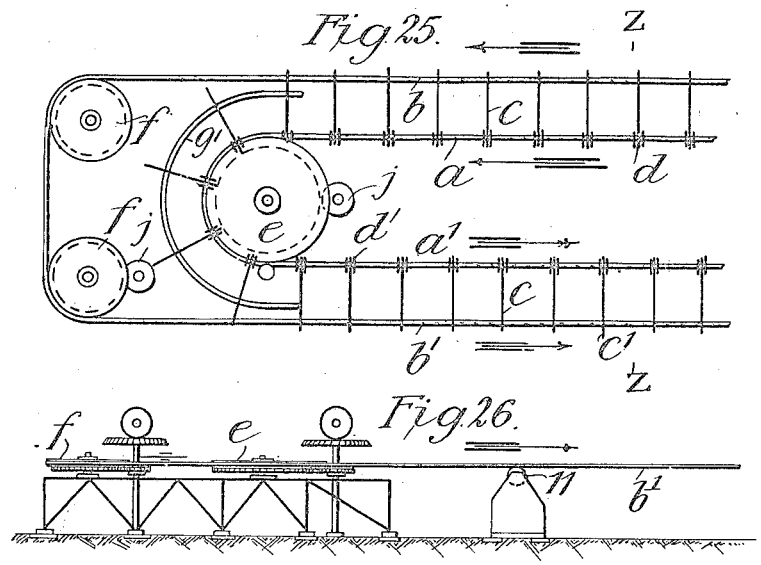
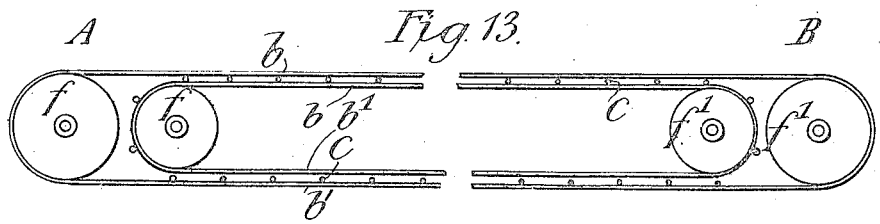
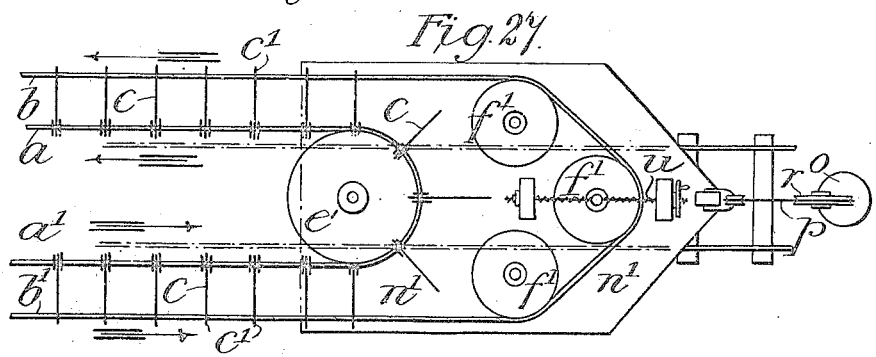
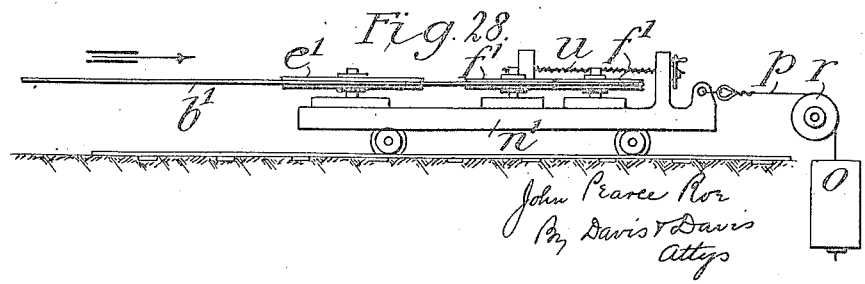

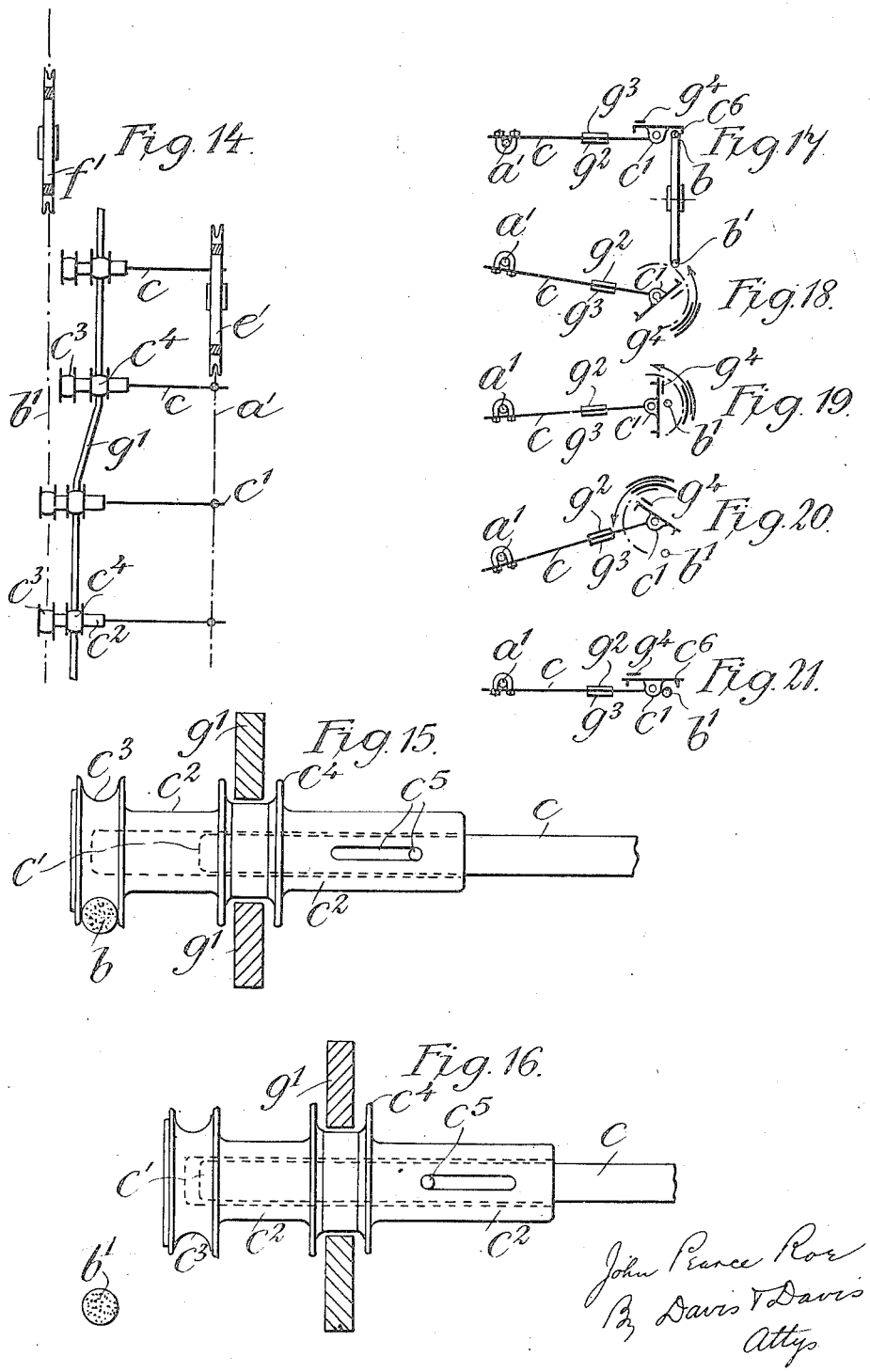

J. P. ROE.
ENDLESS CONVEYER.
APPLICATION FILED APR. 19, 1919.
1,363,533.
Patented Dec. 28, 1920.
8 SHEETS—SHEET 6.
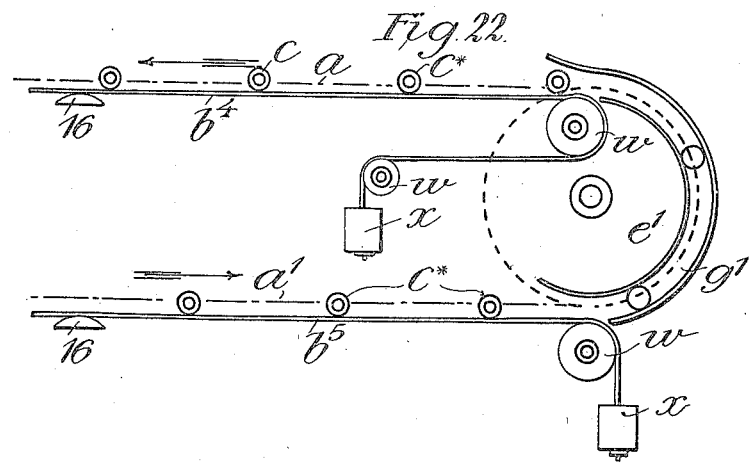
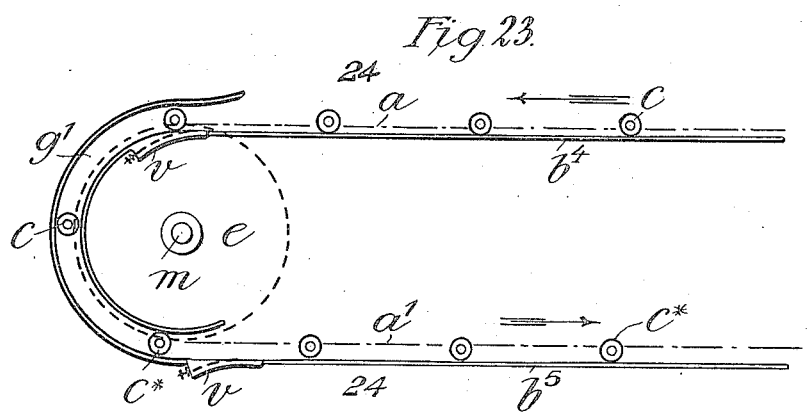
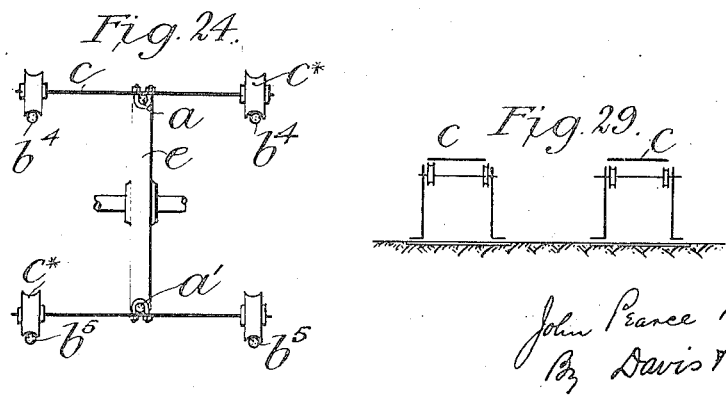

J. P. ROE.
ENDLESS CONVEYER.
APPLICATION FILED APR. 19, 1919.
1,363,533. Patented Dec. 28, 1920.
8 SHEETS—SHEET 7.
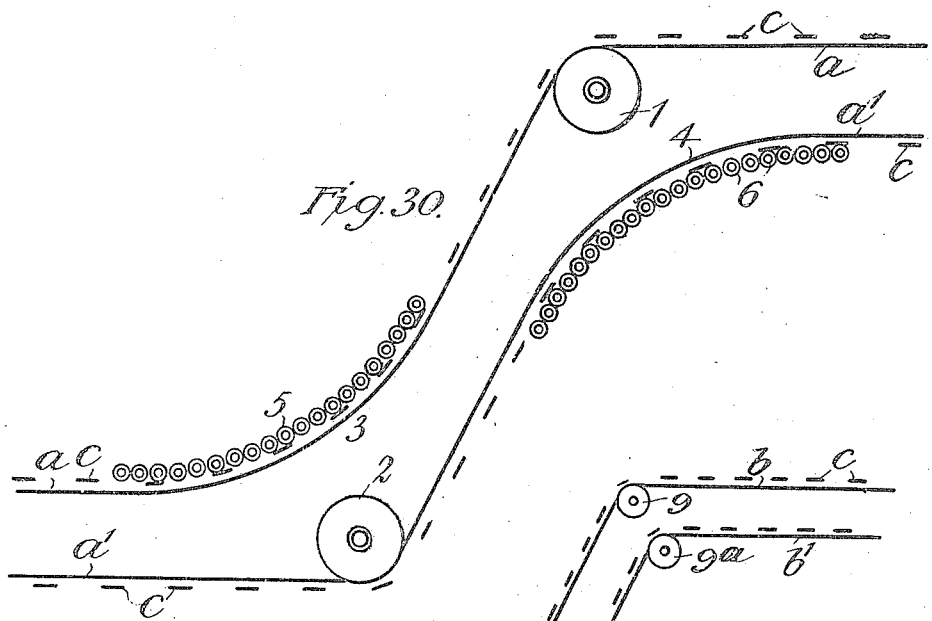
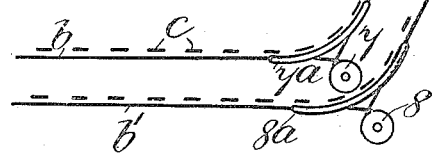
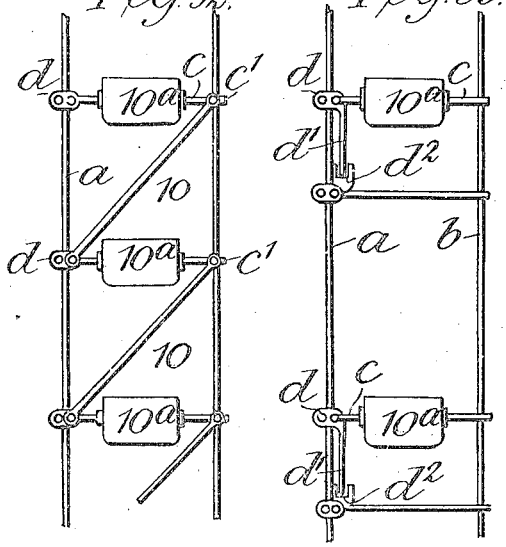
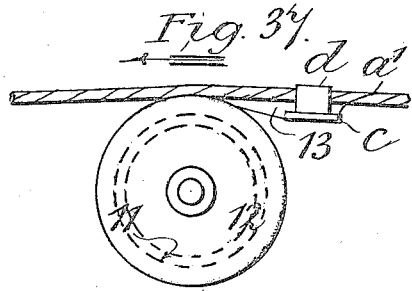

J. P. ROE.
ENDLESS CONVEYER.
APPLICATION FILED APR. 19, 1919.
1,363,533.
Patented Dec. 28, 1920.
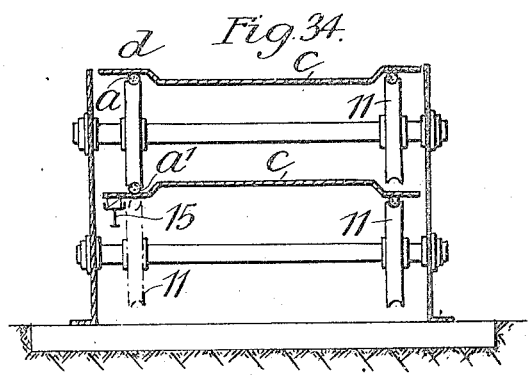
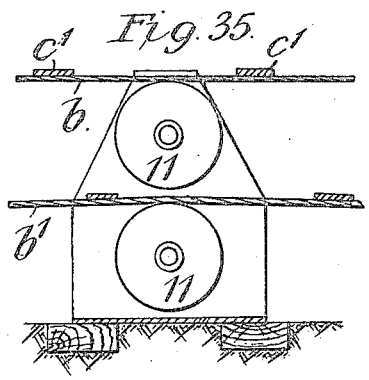
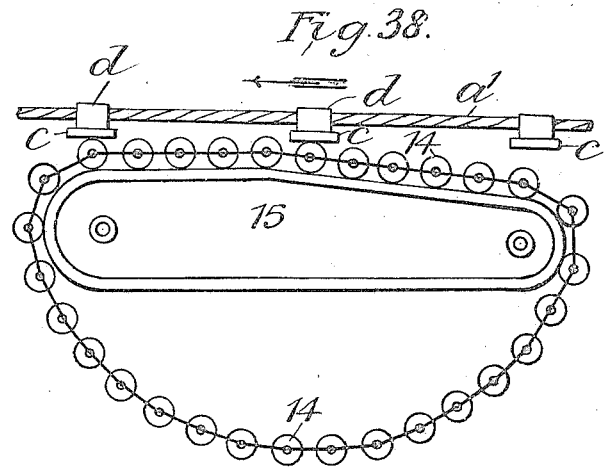
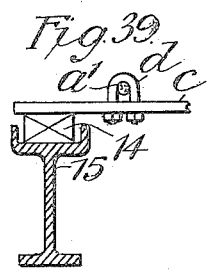
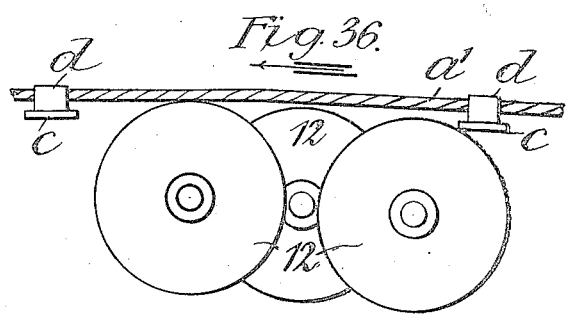
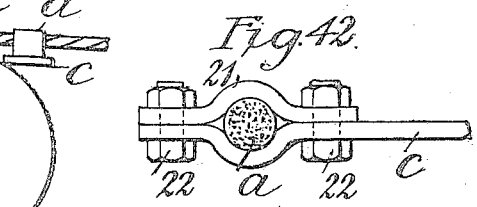
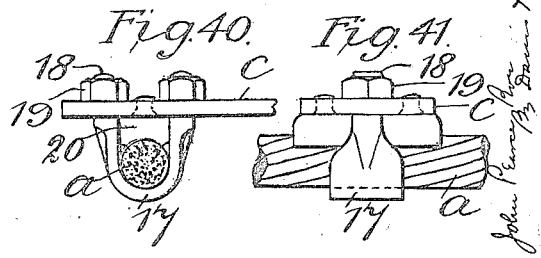
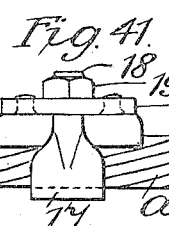

UNITED STATES PATENT OFFICE.

JOHN PEARCE ROE, OF FINSBURY, LONDON, ENGLAND.

ENDLESS CONVEYER.

1,363,533.  Specification of Letters Patent.  Patented Dec. 28, 1920.

Application filed April 19, 1919. Serial No. 291,296.

*To all whom it may concern:*

Be it known that I, JOHN PEARCE ROE, a subject of the King of Great Britain and Ireland, residing at Finsbury, in the city of London, England, have invented Improvements in or Relating to Endless Conveyers, of which the following is a specification.

This invention has for its object to provide an endless conveyer, using wire ropes or their equivalent, (hereinafter called ropes) adapted, *inter alia*, to be used where an endless chain conveyer would usually be employed, and, as compared with which, a rope conveyer, according to this invention, would be materially less in first cost and upkeep, and would be applicable to relatively long distance transport.

For this purpose, an endless rope conveyer according to the invention, comprises ropes which would ordinarily constitute in effect suspension mediums between supports at considerable distances apart, in place of the usual heavy chains supported by more or less continuous girder work, and transverse slate, trunnion bars, or their equivalent, (hereinafter called carrier bars), for carrying loads, receptacles, buckets, or the like, these carrier bars being fastened to and supported by one of the ropes which is an endless moving traction rope, and supported or partly supported at their free or unattached ends on a separate endless moving rope or ropes, or on a stationary rope or ropes, over which, in each case, the said carrier bars can, when necessary, move freely in the longitudinal direction of the separate moving or stationary rope. The endless conveyer may also comprise means such as carrier bar guides and associated appliances whereby parts of the said rope or ropes can, when desired, be moved out of alinement with other parts thereof and the free ends of the carrier bars brought clear of, and caused to pass from one side of a rope to the other side thereof, so that the said free ends of the carrier bars may derive support from such rope without being attached thereto, both when moving forward and backward.

Or the carrier bars may be adapted to be moved clear of or from one side of one rope to the other side of the other rope without deviating parts of the length of such rope.

For distinguishing purposes, a rope to which the carrier bars are attached will hereafter be called a main rope, and a rope to which the carrier bars are not attached will be called an auxiliary rope. Also, for descriptive purposes, it may be assumed that a conveyer would either be horizontal or inclined, and hence when the planes of rope terminal wheels are normally vertical, or inclined to the vertical, there would be an upper and a lower part of an endless loop of rope, and this applies in a like manner to stationary ropes. Hence, for distinction in simple terms, these parts of a rope may conveniently be called upper and lower ropes, respectively.

For deviating parts of an endless moving auxiliary rope or ropes out of alinement with other parts for the purpose of clearing the unattached or free ends of carrier bars as hereinbefore mentioned, guide sheaves or their equivalent may be employed, or at terminals the end wheels may be canted and guide sheaves employed in conjunction therewith, while for passing the free or unattached ends of carrier bars from one side of an auxiliary rope or ropes to the other side of the said rope or ropes, so as, for example to keep the unattached ends of the carrier bars on the top side of either an upper or lower auxiliary rope, the carrier bar ends may enter or take on suitably formed guides, along or around which they can travel when not supported by an auxiliary rope or ropes.

Or, for the same purpose, the carrier bars may be made telescopic in length or be provided at their free ends with pivoted parts adapted by suitable guiding means to be moved from the top of one rope and placed on the top of another rope.

Means are also provided for regulating or adjusting the tension, either conjointly or independently, of more than one rope with regard to another, and also compensating gear for causing two or more ropes to travel at the same velocity, together with appliances for supporting the said ropes at intervals of their length by means of sheaves, sliders, roller chains, or the like, mounted on suitable supports or frames. Also, similar devices may be provided, adapted to guide or deflect the ropes from a straight line for the purpose of negotiating angles or curves when this may be desired.

The feature of attaching the carrier bars to one rope only, while permitting longitudinal movement of the unattached ends in relation to an auxiliary rope is essential in the case of a rope conveyer operated by two or more endless moving traveling ropes, because, while their respective rates of travel can be equalized by compensating gear, it is practically impossible to make or splice up a series of long loops of rope to form ropes of the same length, and hence, to eliminate strains on the carrier bar attachments, due to one loop of rope being longer than another, the attachments can advantageously be made to one endless moving rope only, as hereinbefore mentioned. By allowing the ends of the carrier bars to rest upon or have contact with an auxiliary rope or ropes, while being unattached thereto, likewise provides for any creep that would be consequent upon working curves, as seen in plan, with a horizontal or inclined conveyer.

It also follows, with the foregoing arrangement, that the length of an auxiliary rope need not correspond with that of a main or traction rope seeing that while the carrier bars and their attachments to the main rope pass around the peripheries of their corresponding terminal wheels, the free or unattached ends of the carrier bars may work in guides at or adjacent to terminals, so that the axis of a terminal wheel for an auxiliary rope need in no way correspond to that of a main or traction rope terminal wheel.

In the accompanying illustrative drawings, Figures 1 and 2 show respectively in side elevation and plan, the driving terminal end partion of one construction of endless conveyer constructed according to the invention and Figs. 3 and 4 are similar views of the other or tension or adjusting terminal end portion of the endless conveyer. Fig. 5 shows in vertical section on the line 5—5 of Fig. 6 and Fig. 6 in horizontal section on the line 6—6 of Fig. 5, the driving terminal end of the conveyer shown in Figs. 1 and 2 but to a larger scale and in more detail. Fig. 7 shows in vertical section on the line 7—7, of Fig. 8, and Fig. 8 in plan, a modified construction of the driving end of the conveyer. Figs. 9 and 10 show respectively in vertical section and plan, the opposite or tension end of the conveyer shown in Figs. 3 and 4 but to a larger scale. Figs. 11 and 12 are similar views to Figs. 9 and 10 showing a modified construction.

Fig. 13 shows in side elevation, a modified construction of conveyer. Fig. 14 shows in horizontal section and Figs. 15 and 16 partly in cross section and partly in elevation, a modified arrangement for transferring the free ends of the carrier bars from one auxiliary rope to another. Figs. 17 to 21 inclusive show another modified arrangement for this purpose.

Figs. 22 and 23 show in side elevation, the two terminal portions of a modified construction of conveyer. Fig. 24 is a transverse section, on the line 24—24 of Fig. 23.

Figs. 25 and 26 show respectively in plan and side elevation, the driving end and Figs. 27 and 28 show respectively in plan and side elevation the tension end, of another construction of endless conveyer according to the invention. Fig. 29 is a cross section on the line Z—Z of Fig. 25.

Figs. 30 and 31, show in side elevation how an endless conveyer can be arranged to pass from one level to another. Figs. 32 and 33 show, in plan, means for supporting the free ends of the carrier bars in a sidewise direction.

Figs. 34 and 42 are detail views hereinafter more particularly referred to.

The various arrangements are shown more or less diagrammatically and not to scale.

According to the arrangement of endless rope conveyer shown in Figs. 1 to 8 inclusive, there are two endless moving ropes $a$, $a^1$ and $b$, $b^1$, the upper parts $a$ and $b$ of which travel in one direction and the lower parts $a^1$ and $b^1$ in the reverse direction. In this case, $a$, $a^1$ is the main rope to which transverse carrier bars $c$ are fixed by means of clips $d$. $b$ $b^1$ is the auxiliary rope, traveling as near as may be at the same velocity as the main rope and upon which the free or unattached ends $c^1$ of the transverse carrier bars $c$ rest or are supported, so that while they will travel with the auxiliary rope $b$, $b^1$, they will be free to slide thereon longitudinally, so as to accommodate themselves to working curves or to any slight difference in the rate of travel between the main and auxiliary ropes.

$e$ and $e^1$ are terminal sheaves at the driving and brake or adjusting terminal stations A and B respectively of the endless conveyer for carrying the main rope $a$, $a^1$ and $f$ $f^1$ are similar terminal sheaves at the said stations for carrying the auxiliary rope $b$, $b^1$.

As the carrier bars $c$ are attached at one end to the main rope $a$ $a^1$ and bear at their other end $c^1$ upon the top and outer side of the upper auxiliary rope $b$ it will be seen that they and their loads will be supported by both ropes. As the carrier bars approach or reach, for example, a driving terminal station A with its edge wheels $e$ and $f$ and with the upper ropes $a$ and $b$ traveling toward the said terminal, the attached ends of the carrier bars $c$ with the main rope $a$ $a^1$ will pass around the periphery of the corresponding main rope wheel $e$ and the auxiliary rope $b$ $b^1$ will pass around its corresponding terminal wheel $f$, but at or adjacent thereto a portion $b^2$ of the lower auxiliary rope $b^1$ is deviated out of alinement with the remaining portion of the lower auxiliary rope $b^1$, as by guide rollers $g$, so as to become clear of the unattached ends $c^1$ of the carrier bars $c$ and allow these ends to cross its path or axis at a predetermined place. Hence, as the unattached ends $c^1$ of the carrier bars $c$ at such place get no support from the auxiliary rope, their ends are then received by a suitably shaped guide $g^1$ (see Figs. 5 and 6) formed for instance of bent metal bars, along which they travel until passed by the same on to the top side of the lower or return auxiliary rope $b^1$ on its regaining alinement, such lower or return auxiliary rope $b^1$ then supporting them until they reach the other terminal. Thus it will be seen that the unattached ends $c^1$ of the carrier bars $c$ are at one terminal station transferred from the top and outer side of an upper endless moving auxiliary rope $b$ to the top and inner side of a lower endless moving auxiliary rope $b^1$.

The opposite terminal of the endless conveyer having two endless moving loops of rope may be the tension end at terminal station B (see Figs. 9 and 10) and the sequence of operations or movements associated with the carrier bars $c$ at this end will be identical with what has just been described for the loops of ropes at the driving terminal station A, except that the free ends $c^1$ of the carrier bars $c$ will be lifted and guided from the top side of the lower auxiliary rope $b^1$ to the top side of the upper auxiliary rope $b$, which at this terminal station will be the rope deviated out of alinement with the remaining portion of the said upper auxiliary rope for the purpose of enabling the unattached free ends of the carrier bars to be transferred from one side of the rope to the other.

The driving arrangement at terminal station A for the ropes $a$ $a^1$ and $b$ $b^1$ may comprise as shown in Figs. 1 and 2, a driving shaft $h$ mounted in a stationary frame $n$ and provided with a driving wheel or pulley $i$ and with two toothed pinions $j$ and $j^1$ in gear respectively with toothed wheels $k$, $k^1$ fixed respectively to the terminal sheaves $e$ and $f$ which are mounted on shaft $m$.

In Figs. 1 and 2 and in Figs. 5 and 6, the terminal wheels $e$ and $f$ are arranged to rotate in vertical planes so that only the adjacent portion $b^2$ of the lower rope $b^1$ needs to be deviated out of alinement with the remaining portion of such rope by guide rollers $g$. By inclining the terminal wheel $f$ sidewise, as in the arrangement shown in Figs. 7 and 8 so that it rotates in a vertical plane inclined to that in which the terminal wheel $e$ rotates, the portions $b^2$ of the upper and lower ropes $b$ $b^1$ are, with the aid of guide sheaves $g$, deviated laterally from the remaining portions of the upper and lower auxiliary ropes $b$ $b^1$.

In Figs. 3 and 4 and in Figs. 9 and 10, the terminal wheel $f^1$ is canted to rotate in a plane inclined to the vertical so that only the portion $b^2$ of the upper auxiliary rope $b$ is deviated for the purpose hereinbefore mentioned.

In Figs. 11 and 12, the terminal wheel $f^1$ is arranged to rotate in a vertical plane like the terminal wheel $e^1$ but it is displaced laterally with reference to the main portions of the auxiliary ropes $b$ $b^1$ so that both portions $b^2$ of such ropes adjacent to the said terminal wheel $f$, are deviated for the purpose hereinbefore mentioned.

The tension arrangement at the terminal station B may comprise, as shown in Figs. 3 and 4, a movable frame $n^1$ upon which may be mounted the terminal wheels $e^1$, $f^1$, and a force corresponding to the combined rope tension required, can be imparted to the said tension frame $n^1$ by any known or suitable means. But, as the axis of the main rope terminal wheel $e^1$ need not, as shown, correspond with that of an auxiliary rope terminal wheel $f^1$, a supplementary or auxiliary tension arrangement can be introduced, independently of the main tension, so as to adjust the tension between a main rope $a$ $a^1$ and an auxiliary rope $b$ $b^1$ and to take up differential stretch and so forth. Such supplementary tension gear for the auxiliary rope $b$ $b^1$ may be mounted upon and combined with the tension frame $n^1$. In the example shown in Figs. 3 and 4, tension is applied to the main frame $n^1$ carrying the rope terminal wheels $e^1$ and $f^1$ by a weight $o$ acting on the frame $n^1$ through a rope $p$ passing over and under guide pulleys $r$ carried by a stationary frame $s$. The terminal wheel $f^1$ is mounted in bearings $t$ capable of being moved along the main frame $n^1$ by an independent screw arrangement $u$. Or the supplementary tension arrangement may be applied to the auxiliary ropes $b$ $b^1$ at an intermediate point between the terminal stations A and B. Or, alternatively, independent tension gear may be applied separately to each rope.

In some cases the single endless movable auxiliary rope $b$, $b^1$, or each of two lateralily arranged endless auxiliary ropes, as in a modified arrangement hereinafter described may, as shown in Fig. 13, be replaced by two endless movable ropes $b$ $b^1$ arranged so that the loop formed by one is within the loop formed by the other, as seen in side view, and passing around two terminal sheaves $f$ $f$ or $f^1$ $f^1$ at each station, the free end, or one of the free ends, of each carrier bar $c$ extending between the adjacent portions of the two ropes. In this case the free ends $c^1$ of the carrier bars pass from the top of the upper portion $b$ of the inner rope $b$, $b^1$ to the top portion $b^1$ of the outer rope $b$, $b^1$ at terminal station A and from the top portion $b^1$ of the outer rope $b$, $b^1$ to the top portion $b$ of the inner rope $b$, $b^1$ at terminal station B without having to deviate any of the ropes.

Figs. 14, 15 and 16 show one arrangement whereby the free ends $c^1$ of the carrier bars $c$, can at terminal stations, be moved from the top of the endless moving auxiliary rope $b$ and placed upon the top of the endless moving auxiliary rope $b^1$ without deviating any portion of either rope $b$ $b^1$, thus enabling a single endless moving rope, constituted by the two ropes $b$ $b^1$, as in the arrangements shown in Figs. 1 to 12 inclusive, to be used. In this arrangement the upper and lower auxiliary ropes $b$ $b^1$ pass around vertical terminal sheaves $f$ $f^1$ and each carrier bar $c$ is provided with a movable free end portion so that it can be shortened when it is desired to remove it from the top of one of the ropes $b$ or $b^1$ and lengthened when it is required to replace it on the top of the other rope $b^1$ or $b$. For this purpose, in the example now being described, the free end $c^1$ of each carrier bar $c$ is provided with an endwise movable sleeve $c^2$ provided with two grooved portions $c^3$, $c^4$ of which one, namely $c^3$, is designed to bear on the top of the ropes $b$, $b^1$ and the other to bear in a race or guide way $G^1$ at each terminal station. The guides at one terminal station, say B, are so bent and arranged that by acting upon the grooved portion $c^4$ on the sleeve $c^2$ of each carrier bar $c$, it will lift the corresponding grooved part $c^3$ from the top of the lower auxiliary rope $b^1$ and move it laterally inward with reference to such rope, as shown in Fig. 16, and guide such end of the carrier bar while the bar is being carried around the terminal wheel $e^1$ by the lower traction rope $a^1$ and will then move the sleeve outward and deposit the grooved part $c^3$ upon the top of the auxiliary rope $b$ (Fig. 15). The guides $G^1$ at the opposite terminal station, say A, act in a similar manner to raise the sleeve $c^2$ from the top of the upper auxiliary rope $b$ and move them laterally inward to clear the said rope and after being carried around in the guides $G^1$ by the action of the main rope $a$ and terminal wheel $e$, are moved outward and placed upon the top of the lower auxiliary rope $b^1$. Each sleeve $c^2$ may be connected to its carrier bar $c$ by a pin and slot connection $c^5$ to limit its endwise movement when not engaged with the guides.

Figs. 17, 18, 19, 20 and 21 show another arrangement whereby the free ends of the carrier bars $c$ can, at terminal stations, be transferred from one portion of a single moving auxiliary rope to the other and vice versa without deviating any portion of the rope. In this case there is pivoted to the free end $c^1$ of each carrier bar $c$, a short tilting bar $c^6$, and at each terminal station there is arranged a pair of guide bars $g^2$ $g^3$ forming between them a guide way through which the successive carrier bars $c$ pass and also an additional guide bar $g^4$. These guide bars are so bent and arranged that at one terminal station each carrier bar $c$ and tilting bar $c^6$ are gradually moved from the positions shown in Fig. 17 to those shown in Figs. 18, 19, 20 and 21 so that the tilting bar is lifted off the upper auxiliary rope $b$, and tilted into a position to clear the said rope (Fig. 19) and then into a position (Fig. 21) to bear upon the lower auxiliary rope $b^1$. At the other terminal station each carrier bar and tilting bar are so moved by the guide bars as to cause the tilting bar to be lifted off the lower auxiliary rope $b^1$ and caused to bear upon the upper auxiliary rope $b$.

The modified construction of endless rope conveyers shown in Figs. 22 and 23 comprises a single endless traveling main rope $a$, $a^1$ to which the transverse carrier bars $c$ are attached by clips, while at their free ends $c^1$ they are supported by and have free longitudinal movement along stationary ropes $b^4$ $b^5$, for which purpose the free ends of the carrier bars may be fitted with rollers $c^*$. Each of the stationary ropes is fixed at one end to a stationary part $v$ and the other end portion is passed around guide pulleys $w$ and connected to a weight $x$, or equivalent tension producing means. As the carrier bars $c$ approach or reach a terminal wheel $e$ or $e^1$, the action will be similar to that already described that is to say, the carrier bars attached to the main traveling rope $a$, $a^1$, will pass around the terminal rope wheel, $e$ or $e^1$, while the free ends of the carrier bars $c$ with their rollers $c^*$ will pass along or around guides $g^1$ $g^1$ so arranged in respect to the auxiliary stationary rope or ropes $b^4$, $b^5$, that the free ends of the carrier bars will be passed respectively from the top side of an upper stationary rope $b^4$ to the top side of a lower stationary rope $b^5$ at one terminal and alternatively from the top side of the lower stationary rope $b^5$ to the top side of the upper stationary rope $b^4$ at the other terminal. In this case also the stationary auxiliary ropes $b^4$ $b^5$ need not be deviated from alinement with the main rope, as the free ends of the carrier bars can be passed by means of guides $g^1$ from one stationary rope to the other stationary rope in the same vertical plane.

In the modified arrangement shown in full and dotted lines in Fig. 10, there are three sets of ropes, namely a central, or approximately central, main rope $a$, $a^1$ and two endless moving auxiliary ropes $b$ $b^1$ arranged at opposite sides of it.

The action at the terminals will be similar to that already described, except that in view of the main rope $a$, $a^1$ being central, each carrier bar $c$ will have two, namely (right and left,) free ends, $c^1$, which will be controlled by corresponding guides $g^1$ (Fig. 10) at the terminals, but as the carrier bars may in this case be balanced, the terminal guides $g^1$ may be either at the ends of the carrier bars, or may be intermediately placed, and the main rope terminal wheels $e\ f$ and $e^1\ f^1$ may form the guides, or parts thereof.

The foregoing description refers more particularly to endless rope conveyers which, when operated horizontally or inclined, have superimposed ropes with terminal wheels on horizontal or approximately horizontal axes, but the invention is equally applicable to an endless rope conveyer having terminal wheels in horizontal or approximately horizontal planes, on axes that would be vertical or approximately so.

Figs. 25 to 29 inclusive show an arrangement of this kind where $a$, $a^1$ are the two portions of the main or traction rope to which the carrier bars $c$ are fixed at one end, $b$, $b^1$ the two portions of the auxiliary rope upon which the free ends $c^1$ of the carrier bars $c$ bear, $e$ and $e^1$ the terminal wheels for the main or traction rope $a\ a^1$, of which $e$ is provided with driving mechanism and $f$ and $f^1$ the terminal wheels for the auxiliary rope $b$, $b^1$, one of the wheels $f^1$ being adjustable lengthwise of the conveyer by adjusting means $u$ on the main tension frame $n$ which is pulled endwise by the independent weight $o$ to keep the ropes strained tight. Such an arrangement may usefully be employed where the carrier bars $c$ have to convey loads in both directions, because there would be no superimposed ropes, but instead the inside ropes $a\ a^1$ and outside ropes $b\ b^1$ seeing that transversely they would occupy a more or less horizontal plane relatively to each other.

It follows from the foregoing description that the invention is adaptable to varying positions of ropes whether operated in conjunction with carrier bar guides $g^1$ or the like for the functions previously described, or not.

Figs. 30 and 31 show how an endless conveyer according to the invention can pass from one level to another. In this case the main or traction ropes $a\ a^1$ are guided by rollers 1 and 2 from one level to another and are supported at the curved portions 3 and 4 of their length, where they would otherwise tend to assume straight lines, by a number of rollers 5 and 6 and under and over which the ropes $a\ a^1$ with the attached ends of the carrier bar $c$ pass. The auxiliary ropes $b\ b^1$ carrying the free ends $c^1$ of the carrier bars $c$ each pass completely around the lower guide wheels 7 and 8 and also over upper guide wheels 9 and $9^a$. Fixed curved guide bars $7^a$ and $8^a$ serve to support and guide the free ends $c^1$ of the carrier bars $c$ at the places where the ropes $b\ b^1$ pass around the guide wheels 7 and 8.

When an endless rope conveyer, or part thereof, is worked vertically, or is steeply inclined, with the carrier bars $c$ attached to one rope only as described, gravity stresses due to loads imposed on transverse carrier bars overhung from their attachments $d$ to the main ropes $a\ a^1$ are transmitted to the main ropes in a longitudinal direction thereto although not imposed at its axis, and as such loads will severely strain attachments $d$ of short base constructed to easily pass around terminal wheels, provision must in such cases be made for minimizing such strains, as also any local rope distortion due to short base attachments. Means for this purpose may take the form of extensions or their equivalent, from the carrier bars or their attachments, which will react on a base on the rope equal to the distance between any two carrier bars, or any intermediate base, by causing an extension from one carrier bar to bear upon or engage with a corresponding part or extension from another carrier bar, and so on in sequence. Such extensions and their corresponding parts have play or movement relatively to each other in a plane corresponding to the bend of a rope and when passing around a terminal wheel or the like.

Fig. 32 shows an arrangement of this kind wherein a diagonal bar 10 connects the free end $c^1$ of each carrier bar $c$ to the rope attachment or clip $d$ of the next carrier bar $c$, on the corresponding traction rope $a$. $10^a$ are buckets on the carrier bars.

Alternatively, a rope attachment or clip $d$ on a carrier bar $c$ may, as shown in Fig. 33, be so formed as by providing it with an extension $d^1$ arranged to take into a recessed portion $d^2$ of an adjacent clip or attachment $d$ on the rope $a$, as to provide an extended base on the rope in the plane that would not be subject to bending, while the bases of adjacent clips $d\ d^2$ would be relatively short in a plane at right angles thereto, corresponding to rope bend in passing around a terminal wheel.

As according to this invention, light ropes or their equivalent worked at considerable tension will take the place of more or less continuously supported bearing chains, the said ropes may be supported at relatively long intervals between terminals by passing them over suitable intermediate supporting devices mounted on standards between which the ropes will form catenaries or suspension curves for sustaining the loads. But as the functions of a main and auxiliary rope differ somewhat, the rope supporting devices are arranged accordingly so as to meet the variations in duty referred to.

For instance, with a conveyer having, as in the examples shown in Figs. 1 to 12 inclusive, an endless moving main rope constituted by upper and lower ropes $a\ a^1$ to which the corresponding ends of transverse carrier bars $c$ are attached, and one endless moving auxiliary rope constituted by upper and lower ropes $b\ b^1$ upon which the unattached or free ends of the carrier bars $c$ merely bear, there will in effect be two parallel loops of endless ropes working at any desired distance apart transversely, that will pass around their respective terminal wheel $e\ e^1$ and $f\ f^1$ in vertical planes or approximately so. As already described, the unattached ends of the carrier bars $c$ will bear on the top side of either an upper or a lower auxiliary rope $b$ or $b^1$ between the terminals of the conveyer, so that grooved sheaves 11 of usual construction or form can be employed for supporting the upper and lower auxiliary ropes $b\ b^1$ between the terminal stations. But in the case of the main moving ropes $a\ a^1$ with carrier bars $c$ attached thereto by means of clips $d$, the said carrier bars would be on the outside of a loop comprising an endless moving main rope, that is to say, on the top side of an upper main rope $a$ and on the underneath side of a lower main rope $a^1$. The upper main rope $a$ and the parts of the carrier bar clips $d$ embracing the portion of the said rope that would bear on the intermediate supporting sheaves, can conveniently pass over such sheaves, as well as around terminal wheels. With a lower main rope $a^1$ however, while those parts of the rope between carrier bars may be supported by sheaves of usual form, the carrier bars $c$ with their clip tightening devices $d$ on the underside of the lower moving main rope $a^1$ will form obstacles to their smooth passage over such intermediate sheaves. Consequently it is desirable to provide means whereby, for instance, when a carrier bar $c$ on a lower main rope $a^1$ would make contact with an intermediate sheave, the lower rope $a^1$ and clip device $d$ will be lifted clear of the intermediate sheave groove, and become supported by one or more carrier bars $c$ bearing upon a suitably formed flange on the sheave. To minimize the shock of lifting a traveling rope $b^1$ by means of sheave flanges acting on the carrier bars, more than one rotating flange or disk working in series may be employed, as shown in side elevation in Fig. 36, where three plain lifting disks 12, mounted on axes at different heights, are arranged gradually to lift the end of the carrier bars $c$ fixed to the lower rope $a^1$ clear of the corresponding intermediate grooved guide sheave for such rope.

Or the fixed end of each carrier bar $c$ and clip $d$ may, as shown in Fig. 37, carry an inclined extension 13 adapted to engage the plain periphery of the lifting sheave 12 and gradually lift the clip on the rope clear of the associated intermediate grooved supporting sheave 11 and thus avoid shock. Or the fixed ends of the carrier bars $c$ may first make contact with an inclined slide or bar, 70 roller chain or the like, from which they would pass on to a sheave for lifting the clips $d$ free from the associated grooved supporting sheave.

Alternatively, when carrier bars $c$ are closely spaced, as shown for instance in Figs. 38 and 39, slides, roller chain paths 14 or equivalent, carried by a fixed support 15 as shown, may support the corresponding fixed ends of two or more carrier bars $c$ passing over them in series, so that the lower main rope $a^1$ with clip attachments $d$ will be entirely supported thereby at an intermediate part of its length without the employment of guide sheaves directly in contact with the said rope.

The above means for avoiding shock between intermediate supporting sheaves and the carrier bar clips $d$ on a lower main rope $a^1$, particularly refer to a conveyer having two endless loops of traveling rope, with carrier bars attached to the main rope on one side of a conveyer and extending transversely to and over an auxiliary rope on the other side, as in Figs. 1 to 12 inclusive. But with a conveyer having three endless traveling loops of rope as shown in full and dotted lines in Fig. 10, the center loop being the main rope $a$, $a^1$ to which the carrier bars $c$ are attached, and the two outer loops $b$, $b^1$ and $b\ b^1$ being auxiliary ropes, the supporting means between terminal may comprise rope sheaves of usual form, one of which is shown at 11 in Fig. 35 seeing that, as already described, the upper ropes at $b$, $b$ can pass smoothly over their corresponding supporting sheaves, while the lower or return ropes $b^1\ b^1$ may be supported in the same manner, except the lower central main rope $a^1$ with its clip attachments $d$, because with this arrangement, the auxiliary ropes $b\ b^1$ will support the carrier bars $c$ at both of their ends, and the lower main rope $a^1$ may in turn derive its support from the carrier bar attachments and carrier bars without any mechanism such as sheaves or the like, beneath it.

In an endless conveyer according to the invention comprising a central traction rope $a\ a^1$ and two outer auxiliary ropes $b\ b^1$ and $b\ b^1$ it is not necessary that the free ends of the carrier bars should be transferred from the top of each of the auxiliary ropes $b$ to the top of each of the lower auxiliary ropes $b^1$ because the two ends of each bar by bearing against the lower side of each of the lower auxiliary ropes will be prevented from turning about the lower central traction rope $a^1$ to which the central portions of the bars are fixed. Therefore, in such an arrangement of endless conveyer, a lower main central traveling rope $a^1$ with its attached carrier bars $c$, may be supported between terminal stations by intermediate sheaves, roller chains, slides, or equivalent as hereinbefore described with reference to Figs. 34 to 39 inclusive, in which case the lower and outer auxiliary ropes $b^1$ $b^1$ may rest upon the top sides of the corresponding carrier bars near their outer ends, so that the lower auxiliary ropes will derive their support from the main rope through the medium of the carrier bars.

In the case of a conveyer with endless traveling loops of rope in a horizontal plane, or approximately so, in relation to each other, as in the arrangement of endless conveyer shown in Figs. 25 to 29 inclusive, any projecting clip attachments $d$ would normally be on the top side and therefore all the ropes may be supported by sheaves of usual form.

Where stationary or standing auxiliary ropes are employed, as in Figs. 22 and 23, they may, instead of passing over sheaves or the like, be supported by saddles 16 (see Fig. 22) mounted upon the intermediate standards.

Reference has already been made to working curves or angles, and as the carrier bars are attached to one rope only, slip or creep may take place between the unattached ends of carrier bars and an auxiliary rope or ropes. Hence curves are practicable in endless conveyers according to this invention, and may be negotiated by means of sheaves, rollers, or other equivalents arranged or canted to take the thrust or pressure of a rope or ropes, due to their deviation from a straight line.

It is further to be noted that as the ropes are flexible in all directions, their transverse planes in respect to each other, may be altered so as, in effect, to form a spiral. That is to say, a series of vertical, inclined, or horizontal ropes, viewed endwise may have their axes in a transverse plane arranged in one direction at a certain part of a conveyer and have the said plane twisted at another part or parts through any desired angle over a pre-arranged or given length of conveyer.

The attachment of the carrier bars $c$ to a main rope $a$, $a^1$ may be by means of clips, conveniently of the construction shown in end and side views in Figs. 40 and 41 respectively.

According to this construction, a thin horse-shoe shaped band or strip 17 of metal is adapted to encircle half the circumference of a rope $a$ or $a^1$ in such a manner, as shown, that it will freely pass around terminal wheels and over intermediate supporting sheaves against which a rope with a series of such bands will make contact. The said band is provided with extensions 18 for screw nuts 19, or alternatively for the reception of cotters, such extensions being adapted to pass through corresponding holes in a suitably formed part of a carrier bar $c$, so that when the nuts, or cotters, as the case may be, are tightened, the corresponding part of the carrier bar would be brought hard home on one side of the rope, while the horse-shoe band, would be drawn tightly around the other side. Or, as shown, between the rope $a$ and the carrier bar $c$ a distance piece 20 may be inserted, or such distance piece may form an integral part of the carrier bar, and be grooved to receive the adjacent side of a rope. The said grooved part of the distance piece may have a helical projection, or projections, conforming to the lay of the rope, so as to provide a lock in addition to a frictional grip.

Fig. 42 shows in end view a modified form of clip device according to which one end of the carrier bar $c$ is recessed, as shown, to fit the rope $a$ and is fixed thereto by a correspondingly recessed cover strip 21 and nuts and bolts 22.

While adhering to the main features of the invention, it is obvious that details of parts and the arrangements thereof hereinbefore described can be varied to suit different requirements.

Thus means of any known or suitable kind may be provided, for preventing any difference in speed between the traction rope $a$, $a^1$ and auxiliary rope $b$, $b^1$, or ropes, that might otherwise arise for any reason.

The carrier bars can be made of various shapes and dimensions to suit requirement. Thus, they may be straight from end to end (see Fig. 24), or be depressed, (see Fig. 34), or raised at intermediate portions of their lengths, or be provided with lateral stops to prevent sidewise motion of boxes or other articles placed upon them. Also, they may be adapted to carry buckets (see $10^a$, Figs. 32 and 33) or like receptacles of known or suitable kind for holding coal and other loose material that can be dumped where necessary in known ways.

In some cases the free ends $c^1$ of the carrier bars $c$ may be adapted to prevent them from moving vertically with reference to the auxiliary ropes $b$, $b^1$ without however interfering with their ability to move longitudinally with reference to the said ropes. Thus, each free end of a carrier bar may be made fork shape and the rope pass through it; or it may be provided with a bent arm or finger arranged to extend to the opposite side of the rope to that at which the free end is arranged.

Having now particularly described and ascertained the nature of my said invention and in what manner the same is to be performed I declare that what I claim is:—

1. A conveyer of the kind herein referred to, comprising an endless traveling traction rope supporting means over which said rope travels and between which it is freely suspended, transverse carrier bars fixed to said rope and having free end portions and an auxiliary suspension rope system independent of the traction rope and from the carrier bars but arranged to support the free ends of said bars.

2. A conveyer according to claim 1, wherein the traction rope and auxiliary rope system are arranged in substantially parallel vertical planes.

3. A conveyer of the kind herein referred to, comprising an endless traveling traction rope, supporting means over which said rope works and between which it is freely suspended, transverse carrier bars fixed to said traction rope and having free end portions, an auxiliary suspension traveling rope system independent of the traction rope and disconnected from the carrier bars but arranged to support the free end portions thereof.

4. A conveyer of the kind herein referred to, comprising an endless traveling suspended traction rope, means for supporting said rope and between which it is freely suspended, transverse carrier bars fixed to said rope and having free end portions, an endless traveling auxiliary suspension rope system arranged independent of the traction rope and adapted to support the free end portion of the carrier bars from which it is disconnected and means for supporting said auxiliary rope system and between which said rope system is freely suspended.

5. A conveyer of the kind herein referred to, comprising an endless suspended traction rope, an auxiliary rope system independent of the traction rope, terminal sheaves around which the traction rope and auxiliary rope system work and from which they are suspended, transverse carrier bars fixed to the traction rope and having free end portions supported by the auxiliary rope system, means for driving the traction rope and tension means for imparting the desired tension to the traction rope and auxiliary rope system.

6. A conveyer of the kind herein referred to, comprising an endless traveling suspension traction rope, transverse carrier bars fixed to said rope and having free end portions, an auxiliary rope system having portions thereof arranged substantially parallel to the forwardly and backwardly traveling portions of the traction rope and adapted to support the free end portions of the carrier bars, terminal sheaves for the traction rope and means arranged near the terminal sheaves for the traction rope and means arranged near the terminal sheaves adapted to guide the free end portions of the carrier bars from one portion of the auxiliary rope system to another portion thereof when the traction rope passes around the terminal sheaves.

7. A conveyer of the kind herein referred to, comprising an endless traveling suspension traction rope, transverse carrier bars fixed to said rope and having free end portions, an auxiliary rope system comprising upper and lower portions arranged in a plane substantially parallel to upper and lower portions of the endless traction rope and adapted to support the free ends of the carrier bars, terminal sheaves for the traction rope and means arranged near the terminal sheaves adapted to guide the free end portions of the carrier bars from an upper portion of the auxiliary rope system to a lower portion thereof.

8. A conveyer of the kind herein referred to, comprising an endless traction rope, transverse carrier bars fixed thereto, terminal wheels around which the endless traction rope travels, a second traveling ropeway adapted to loosely support the free ends of such carrier bars and means adapted to automatically receive and support the free ends of the carrier bars and guide the same from one part of the traveling supporting ropeway to another part thereof, substantially as described.

9. A conveyer of the kind herein referred to, comprising an endless traction rope, transverse carrier bars fixed thereto, terminal wheels rotating in vertical planes around which the endless traction rope travels, a second ropeway parts of which follow a course parallel to the portions of the traction rope which move in opposite directions and are adapted to loosely support the free ends of the carrier bars and means whereby such free ends of the bars are conducted from the upper side of a part of the supporting ropeway to the upper side of another part of such ropeway adjacent to a portion of the traction rope traveling in the reverse direction, substantially as described.

10. A conveyer of the kind herein referred to comprising an endless traction rope, carrier bars fixed thereto, terminal wheels, rotating in vertical planes, around which the endless traction rope travels, a second endless traveling ropeway parts of which travel in the same direction as oppositely moving portions of the traction rope and are adapted to loosely support the free ends of the bars and means whereby such free ends of the bars are conducted from the upper side of a part of the supporting ropeway to the upper side of another part of such ropeway adjacent to a portion of the traction rope traveling in the reverse direction, substantially as described.

11. A conveyer of the kind herein referred to comprising an endless traction rope, carrier bars fixed thereto, terminal wheels rotating in vertical planes, around which the traction rope travels, a second ropeway parts of which, instantaneously considered, are in the same horizontal plane as corresponding portions of the traction rope and serve to support the free ends of the bars, and means whereby such free ends of the bars are conducted from the upper side of a part of the supporting ropeway to the upper side of another part of such ropeway adjacent to a portion of the traction rope traveling in the reverse direction, substantially as described.

12. A conveyer of the kind herein referred to, comprising an endless traction rope, carrier bars fixed thereto, terminal wheels, rotating in vertical planes, around which the traction rope travels, a second endless traveling ropeway parts of which, instantaneously considered, are in the same horizontal plane as corresponding portions of the traction rope and are adapted to loosely support the free ends of the bars and means whereby such free ends of the bars are conducted from the upper side of a part of the supporting ropeway to the upper side of another part of such ropeway adjacent to a portion of the traction rope traveling in the reverse direction, substantially as described.

13. A conveyer of the kind herein referred to, comprising an endless traction rope, carrier bars fixed thereto, terminal wheels, rotating in vertical planes, around which the traction rope travels, a second endless ropeway parts of which are arranged parallel to corresponding portions of the traction rope and adapted to loosely support the free ends of the carrier bars, means locally deflecting such endless supporting ropeway from the parallel position so that the free ends of the bars can run off said supporting ropeway and means for supporting said free ends after leaving said portion of the ropeway and guiding them on to the upper side of a portion of the supporting ropeway adjacent to a reversely moving part of the traction rope, substantially as described.

14. A conveyer of the kind herein referred to comprising an endless traction rope, carrier bars fixed thereto, terminal wheels, rotating in vertical planes, around which the traction rope travels, a second ropeway parts of which, instantaneously considered, are in the same horizontal plane and parallel to corresponding portions of the traction rope traveling in the same direction as oppositely moving portions of the traction rope, which ropeway parts are adapted to loosely support the free ends of the bars aforesaid, means locally deflecting such endless supporting ropeway from the parallel position so that the free ends of the bars can run off said supporting ropeway and means for supporting said free ends after leaving said portion of the ropeway and guiding them on to the upper side of a portion of the supporting ropeway adjacent to a reversely moving part of the traction rope, substantially as described.

15. A conveyer of the kind herein referred to, comprising an endless traction rope, carrier bars fixed thereto, terminal wheels, rotating in vertical planes, around which the traction rope travels, a second endless ropeway parts of which are arranged parallel to portions of the traction rope and are adapted to loosely support free ends of the bars, a terminal wheel for such ropeway disposed beyond one of the terminal wheels of the traction rope and occupying a plane inclined to the latter, guide wheels locally deflecting such supporting ropeway from the parallel position so that the free ends of the bars can run off such supporting ropeway and means for supporting said free ends after leaving said portion of the ropeway and guiding them on to the upper side of a portion of the supporting ropeway adjacent to a reversely moving part of the traction rope, substantially as described.

16. A conveyer of the kind herein referred to, comprising an endless traction rope, carrier bars fixed thereto intermediate of their length and a ropeway consisting of two independent sections adapted to loosely support the opposite ends of said bars during both directions of travel, substantially as described.

17. A conveyer of the kind herein referred to, comprising an endless traction rope, carrier bars fixed thereto intermediate of their length and a ropeway consisting of two independent endless traveling sections adapted to loosely support the opposite ends of said bars during both directions of travel, substantially as described.

18. A conveyer of the kind herein referred to, comprising an endless suspension traction rope, terminal sheaves at the terminal stations, around which said rope works, carrier bars fixed to said rope and having free end portions, an auxiliary suspension rope system independent of the traction rope, adapted to support the free end portions of the carrier bars, means for supporting the upper and lower portions of the traction rope at one or more points between its terminal sheaves, the supporting means for the lower portion of the traction rope being of an antifriction nature and adapted to act upon the carrier bars and lift the rope, and means for supporting the auxiliary rope system at one or more places between the terminal stations.

Signed at London, England, this 21st day of March, 1919.

JOHN PEARCE ROE.